United States Patent
Lin et al.

(10) Patent No.: US 9,292,614 B2
(45) Date of Patent: Mar. 22, 2016

(54) METHOD FOR TRANSMITTING INFORMATION BETWEEN MULTIPLE ELECTRONIC PAGES

(75) Inventors: Chih-Chiang Lin, Taipei (TW); Hung-Chun Kao, Taipei (TW); Yu-Sheng Lin, Taipei (TW); Ting-Yu Chiang, Taipei (TW); Shih-Hui Wu, Taipei (TW); Wen-Yuan Wang, Taipei (TW); Cho-Hsuan Lee, Taipei (TW); Chi-Ming Luo, Taipei (TW); Yi-Hua Liang, Taipei (TW); Min-Hui Wu, Taipei (TW); Hsiao-Yun Chen, Taipei (TW); Kuan-Yi Chang, Taipei (TW); Chi-Hsiu Huang, Taipei (TW); Jia-Bin Lai, Taipei (TW); Heng-Chang Lin, Taipei (TW); Yu-Hsiang Wang, Taipei (TW)

(73) Assignee: MIICASA HOLDING (CAYMAN) INC., Grand Cayman (KY)

( * ) Notice: Subject to any disclaimer, the term of this patent is extended or adjusted under 35 U.S.C. 154(b) by 607 days.

(21) Appl. No.: 13/137,528

(22) Filed: Aug. 24, 2011

(65) Prior Publication Data
US 2012/0278427 A1    Nov. 1, 2012

(30) Foreign Application Priority Data

Apr. 27, 2011  (TW) .............................. 100114701 A (51) Int. Cl.
G06F 15/16  (2006.01)
G06F 17/30  (2006.01)
G06F 17/28  (2006.01)

(52) U.S. Cl.
CPC ...... *G06F 17/3089* (2013.01); *G06F 17/30873* (2013.01)

(58) Field of Classification Search
CPC ......................... H04L 28/08072; H04L 29/06
USPC .......................................................... 709/217
See application file for complete search history.

(56) References Cited

U.S. PATENT DOCUMENTS

2003/0080986 A1* 5/2003 Baird .............................. 345/700
2006/0218242 A1* 9/2006 Tock et al. .................... 709/217
2010/0286977 A1* 11/2010 Chin et al. ........................ 704/4

* cited by examiner

*Primary Examiner* — Chris Parry
*Assistant Examiner* — Alan S Chou
(74) *Attorney, Agent, or Firm* — Bacon & Thomas, PLLC (57) ABSTRACT

The present invention is to provide a method for transmitting information between multiple electronic pages. The method is applicable to an information transmission system, which includes at least one terminal device, a web server, a toolbar server and an application server. The terminal device obtains a background page from the web server and a toolbar page from the toolbar server and embeds the toolbar page into the background page. When a user clicks on any of at least one application linking object on the toolbar page through the terminal device, the terminal device is able to obtain a status page from the toolbar server and then store page information on the background or toolbar page into the status page and connect to the application server for obtaining an application page corresponding to the application linking object clicked on, so as to enable the application page to access the page information.

1 Claim, 8 Drawing Sheets

METHOD FOR TRANSMITTING INFORMATION BETWEEN MULTIPLE ELECTRONIC PAGES

FIELD OF THE INVENTION

The present invention relates to a method for transmitting information, more particularly to a method applicable to an information transmission system for transmitting information between multiple electronic pages, wherein the information transmission system includes at least one terminal device, a web server, a toolbar server, and an application server. The terminal device is able to obtain a background page from the web server and a toolbar page from the toolbar server and embed the toolbar page into the background page, such that, when a user clicks on any of at least one application linking object on the toolbar page through the terminal device, the terminal device is able to obtain a status page from the toolbar server and store page information on the background page into the status page, so as to enable an application page corresponding to the application linking object to access the page information.

BACKGROUND OF THE INVENTION

In order to download files from or browse information on the Internet, one can use a web browser installed in a terminal device (e.g., a computer) to connect to a server (e.g., a web server) and thereby access files, web pages, and images stored in the server. The files, web pages, or images thus obtained will be displayed on the terminal device by way of the web browser so as for the user to gather or simply look over the desired information. Nowadays, a variety of web browsers are available for use, including Internet Explorer, Firefox, Google Chrome, Safari, and Opera, for example. All theses web browsers support network protocols like Hypertext Transfer Protocol (HTTP) and Hypertext Transfer Protocol Secure (HTTPS), as well as a wide range of markup languages (e.g., HTML, XHTML, and XML), dynamic scripting languages (e.g., JavaScript and JScript), and image file formats (e.g., GIF, PNG, and JPEG).

Figure 1:
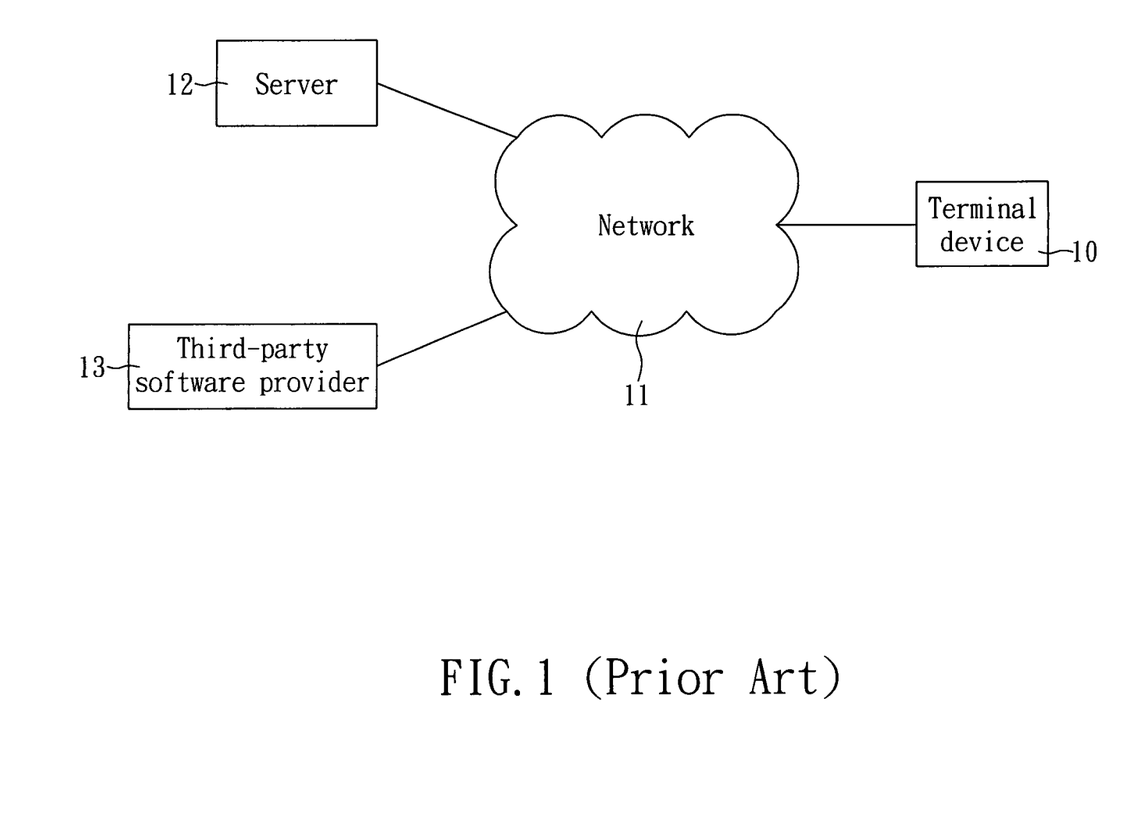
FIG. 1 is a block diagram showing a terminal device, a server, and a third-party software provider in the prior art.
Figure 2:
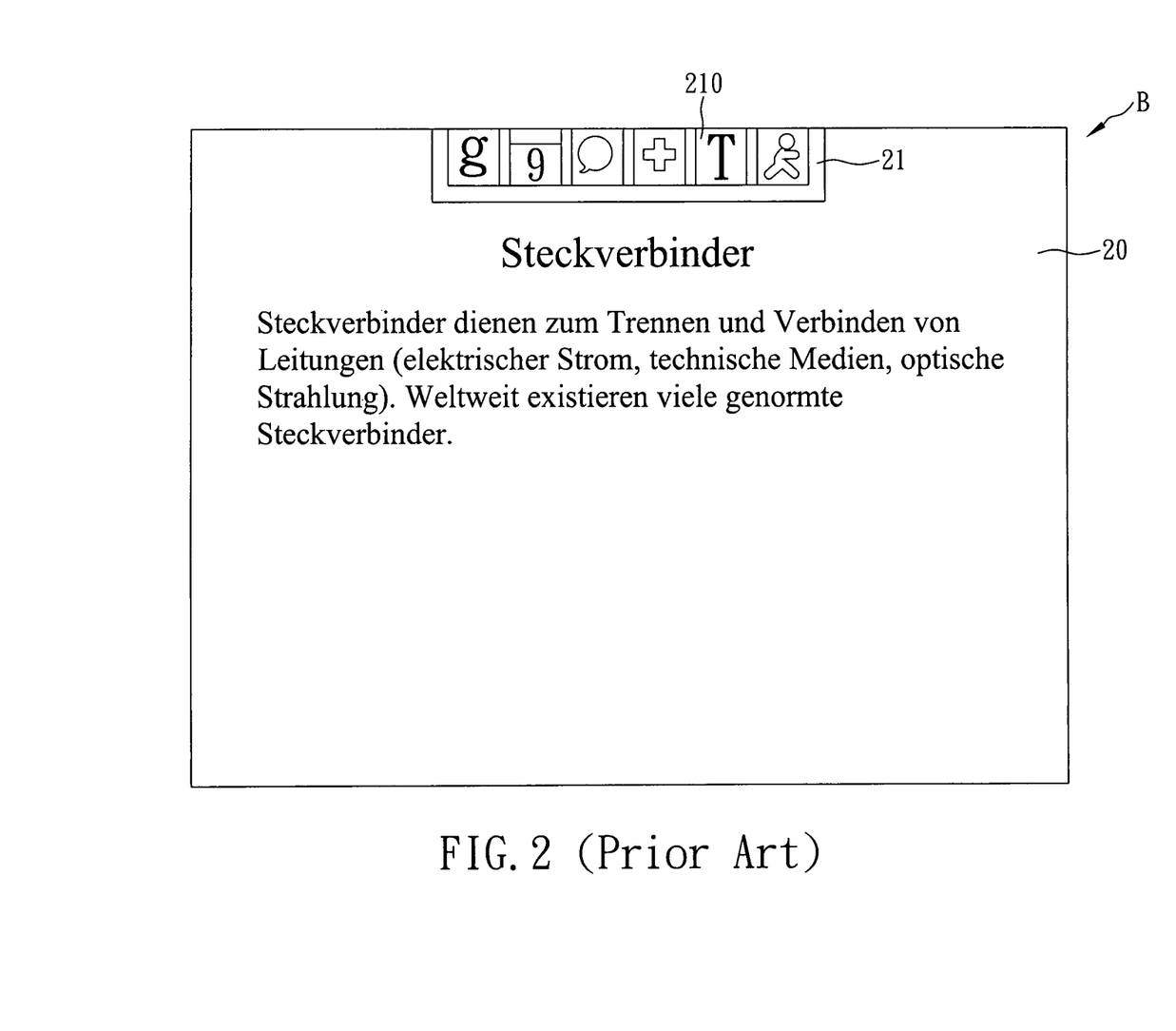
FIG. 2 schematically shows a web browser, a background page, and a toolbar page in the prior art.

Currently, a web browser-based technique for automatically embedding a toolbar page into a background page has been developed. Referring to FIGS. 1 and 2, a web browser of the terminal device 10 can connect to the server 12 through the network 11 and obtain a background page 20 from the server 12. While displaying the background page 20, the web browser embeds a toolbar page 21 into the background page 20, wherein the toolbar page 21 includes several application linking objects 210. By clicking on any of the application linking objects 210 on the toolbar page 21, the terminal device 10 is connected to the third-party software provider 13 corresponding to the application linking object 210 and obtains from the third-party software provider 13 an electronic page of the corresponding application program (e.g., a cloud computing-based image processing program or a translation program), so that image processing or translation can be carried out with the application program obtained. However, given today's technology, information transmission between the electronic page of the application program (hereinafter referred to as "application page") and the background page of the web browser (i.e., the background page 20 where the toolbar page 21 is embedded) is impossible. In other words, the terminal device 10 cannot transfer the headings, content, or other information on the background page 20 to the application page. As a result, failure to obtain page information from the background page 20 imposes limitations on the use of the application programs provided by the toolbar page 21.

Figure 3:
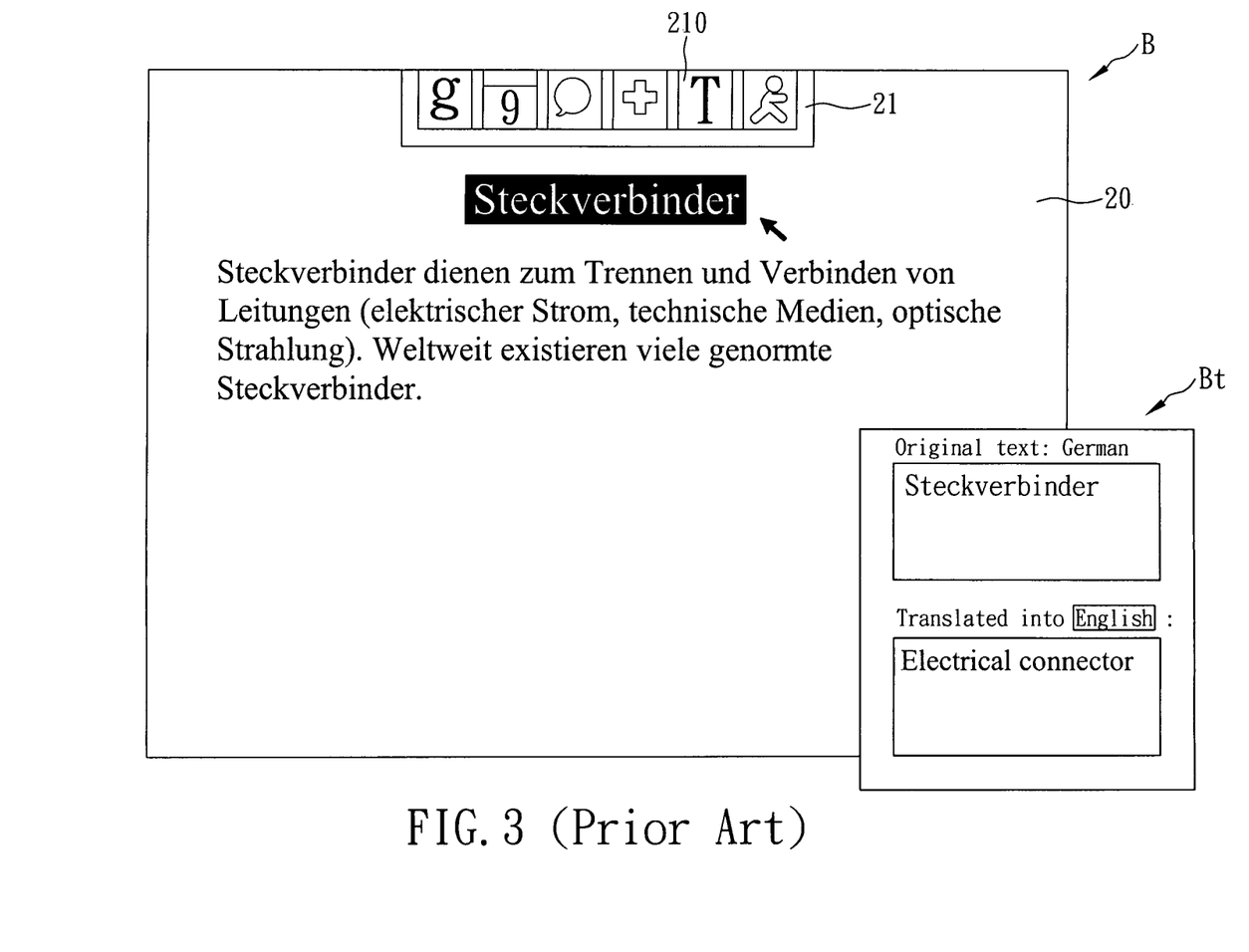
FIG. 3 schematically shows a web browser, a background page, a toolbar page, and an application page in the prior art.

For instance, with reference to FIGS. 1 and 3, the terminal device 10 is so operated that the web browser B loads a background page 20 in German. If the user wants to have the content of the background page 20 translated, it is necessary for the user to first select and copy the text on the background page 20 of the web browser B, then click on the translation application linking object 210 on the toolbar page 21, and once the translation application page Bt is completely loaded, paste the copied text of the background page 20 to the translation application page Bt. Only by such a complicated procedure can the translation application program be used to translate the text of the background page 20 into the desired language (e.g. English). In other words, the terminal device 10 cannot automatically transfer to the translation application page Bt the text or other information (e.g., web page headings) on the background page 20 of the web browser B. Thus, the application programs provided by the toolbar page 21 are restricted in use, function, and fields of application.

Therefore, the issue to be addressed by the present invention is to develop a method for transmitting information between multiple electronic pages (e.g., a background page of a web browser and an application page) and thereby effectively solve the problem of the prior art that free information transmission between different electronic pages has been impossible.

BRIEF SUMMARY OF THE INVENTION

In view of the aforesaid problem of the prior art, the inventor of the present invention conducted extensive research and experiment and finally succeeded in developing a method for transmitting information between electronic pages. It is intended that, with the present invention, information can be freely transferred between different pages of a web browser to increase the convenience, efficiency, and smoothness of web browsing.

It is an object of the present invention to provide a method for transmitting information between multiple electronic pages, wherein the method is applicable to an information transmission system that includes a terminal device, a web server, a toolbar server, and an application server. The terminal device is connected respectively to the web server, the toolbar server, and the application server via a network. The terminal device obtains a background page from the web server and a toolbar page from the toolbar server such that the toolbar page is embedded in the background page. The toolbar page includes at least one application linking object. When a user clicks on any of the at least one application linking object through the terminal device, the terminal device sends a signal to the toolbar server. In response to the signal, the toolbar server sends a status page to the terminal device. Upon receiving the status page, the terminal device stores page information on the background page or page information on the toolbar page into the status page and is connected to the application server to obtain therefrom an application page corresponding to the application linking object clicked on. After obtaining and loading the application page, and as requested by the application page, the terminal device retrieves from the status page the page information on the background page or the page information on the toolbar page. The page information is immediately sent by the terminal device to the application page so as to be processed by the application page. The technical features of the present invention make it possible for the terminal device to transfer the page information on the background page or on the toolbar page instantly to the application page by request of the application page, thus effectively solving the problem of the prior art that information cannot be freely transferred between different electronic pages. Furthermore, no matter the page information is needed after the terminal device loads the application page or during the loading of the application page, the terminal device will provide the page information to the application page right away. Hence, delayed information transmission and pauses in page loading are effectively prevented to substantially increase the efficiency of information transmission. In other words, the efficiency with which the user can use the terminal device to browse electronic pages is effectively enhanced.

It is another object of the present invention to provide the foregoing method, wherein once the application page receives the page information, the terminal device sends the page information to the application server by way of the application page so as to obtain a computation result from the application server.

BRIEF DESCRIPTION OF THE SEVERAL VIEWS OF THE DRAWINGS

A detailed description of further features and advantages of the present invention is provided below with reference to the accompanying drawings, in which.

DETAILED DESCRIPTION OF THE INVENTION

The inventor of the present invention has long been engaged in the research and development and design of network systems. In the process, the inventor has found that although it is now technically practical to automatically embed a toolbar page into a background page of a web browser, thus allowing a user to use the various application programs provided by the toolbar page, it is impossible for a terminal device to transmit page information on the background page to the application pages of the application programs; in consequence, the application programs provided by the toolbar page are limited in use. In order to allow information transmission between such pages and increase the efficiency and smoothness of page browsing, the inventor came up with the idea of storing page information on a background page into a status page so as to enable information transmission between multiple electronic pages.

Figure 4:
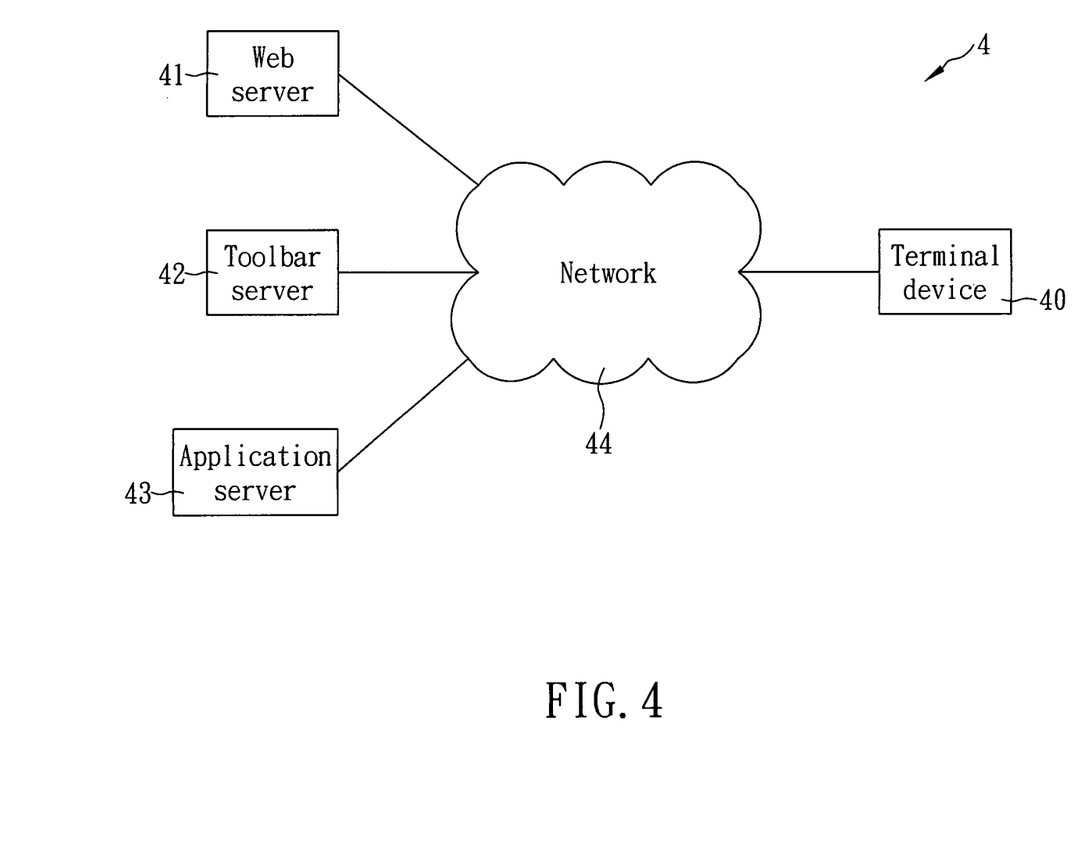
FIG. 4 is a block diagram of a preferred embodiment of the present invention.

The present invention provides a method for transmitting information between multiple electronic pages, wherein the method is applicable to an information transmission system. Referring to FIG. 4 for a preferred embodiment of the present invention, the method is applied to an information transmission system 4 that includes a terminal device 40, a web server 41, a toolbar server 42, and an application server 43. In this preferred embodiment, the terminal device 40 is a personal computer and is connected respectively to the web server 41, the toolbar server 42, and the application server 43 by a network 44. The web server 41 is a server generally used to provide web pages (e.g., HTML files) and is typically configured to transmit web pages to the terminal device 40 using such protocols as HTTP or HTTPS. The toolbar server 42 is set up by a toolbar provider, while the application server 43 is generally operated and managed by one or several third-party application program providers (other than the providers of the toolbar server 42 and the terminal device 40).

Figure 5:
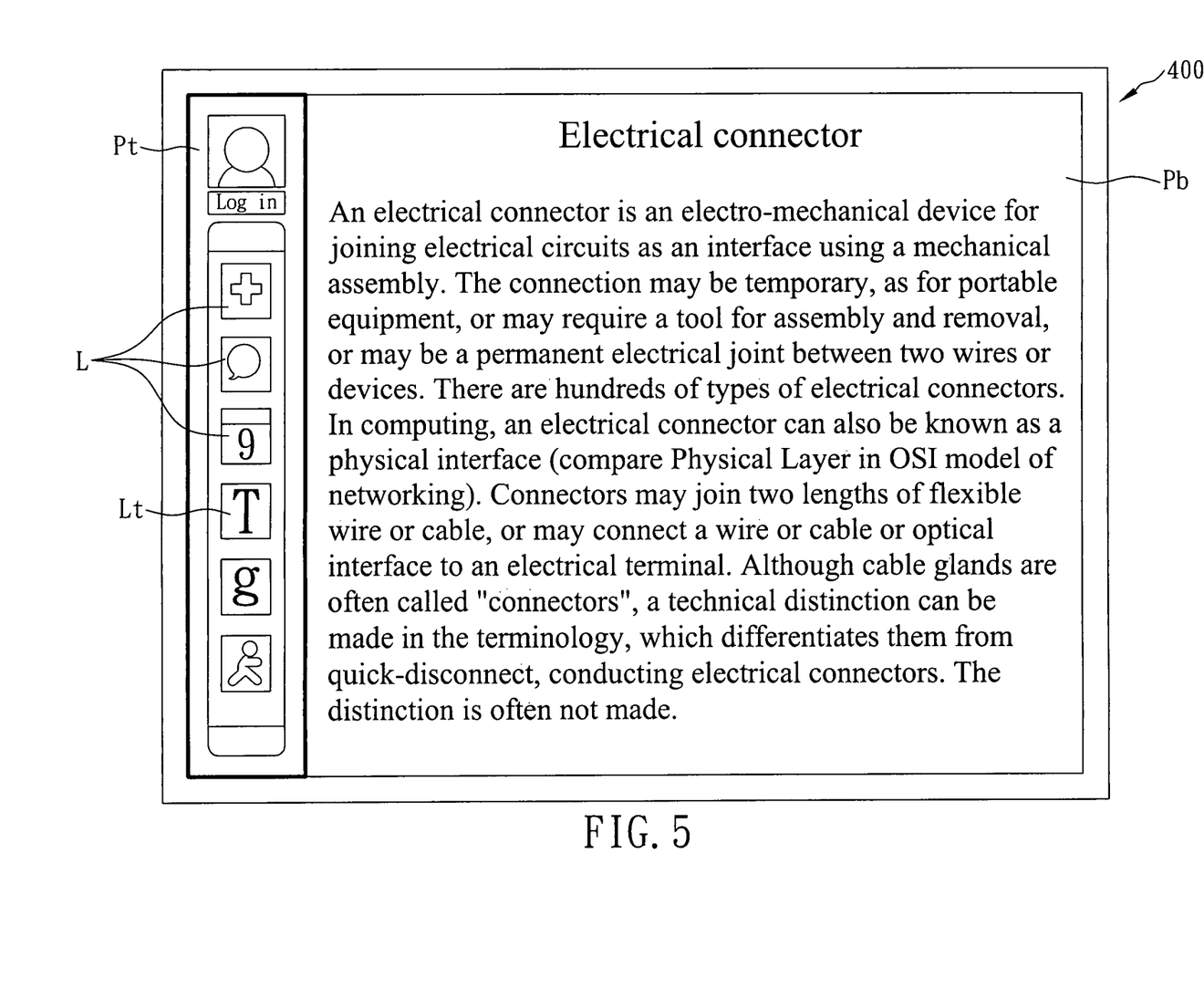
FIG. 5 schematically shows a web browser, a background page, and a toolbar page according to the present invention.

As shown in FIGS. 4 and 5, the terminal device 40 executes a web browser 400 and obtains a background page Pb from the web server 41 through the web browser 400, wherein the content of the background page Pb is in English. The terminal device 40 further obtains a toolbar page Pt from the toolbar server 42, and the toolbar page Pt is embedded in the background page Pb. For example, a gateway device (not shown) connected to the terminal device 40 receives the background page Pb and inserts therein a command written in a dynamic scripting language (e.g., JavaScript or JScript). Thus, when reading the background page Pb, the web browser 400 of the terminal device 40 is connected to the toolbar server 42 according to the command and obtains the toolbar page Pt. The toolbar page Pt includes a plurality of application linking objects L (Lt) that represent different functions, wherein the application linking objet Lt is a linking object for a translation application. It is understood that the design of the toolbar page Pt may vary according to practical needs; the number and types of the application linking objects L (Lt) can be increased or decreased as appropriate. For example, there can be only one application linking object L (Lt).

Figure 6:
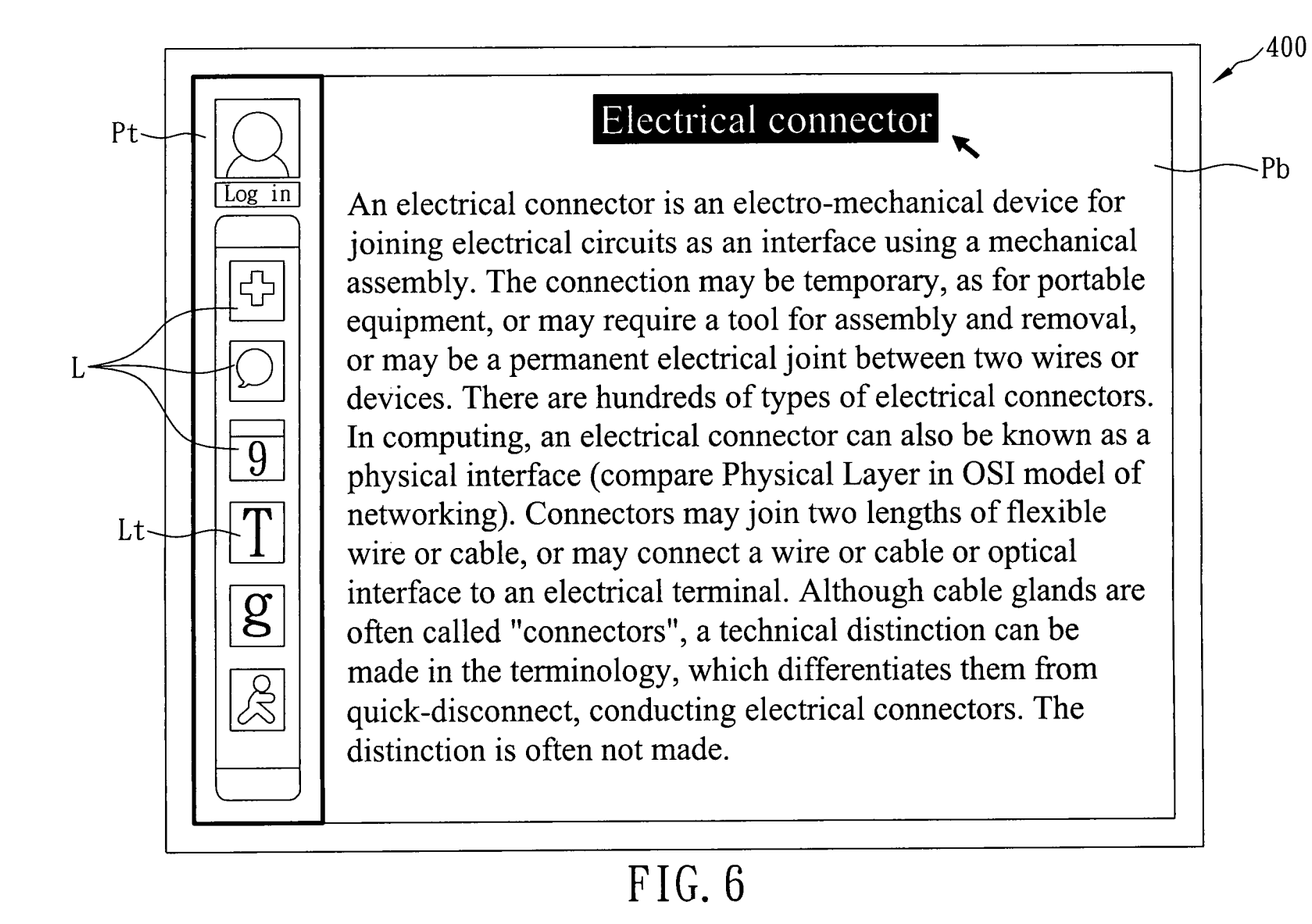
FIG. 6 is another schematic drawing of the web browser, the background page, and the toolbar page depicted in FIG. 5.

In the present preferred embodiment, the user wants a certain part of the text on the background page Pb to be translated into German. Therefore, referring to FIG. 6, the user uses a mouse cursor to select and thereby mark by highlighting the desired part of the text (e.g., "Electrical connector"). Afterward, referring to FIGS. 4 and 7, the user mouse-clicks the application linking object Lt with the terminal device 40, such that the terminal device 40 sends a signal to the toolbar server 42. The toolbar server 42 then sends a status page Ps to the terminal device 40 according to the signal. The status page Ps, once received by the terminal device 40, is not directly displayed on the web browser 400 of the terminal device 40. Instead, the terminal device 40 stores the status page Ps into a cache or elsewhere in the terminal device 40. The terminal device 40 can later store page information on the background page Pb into the status page Ps. In this preferred embodiment, the page information is the user-selected text "Electrical connector", so the terminal device 40 stores the user-selected text "Electrical connector" into the status page Ps.

Figure 7:
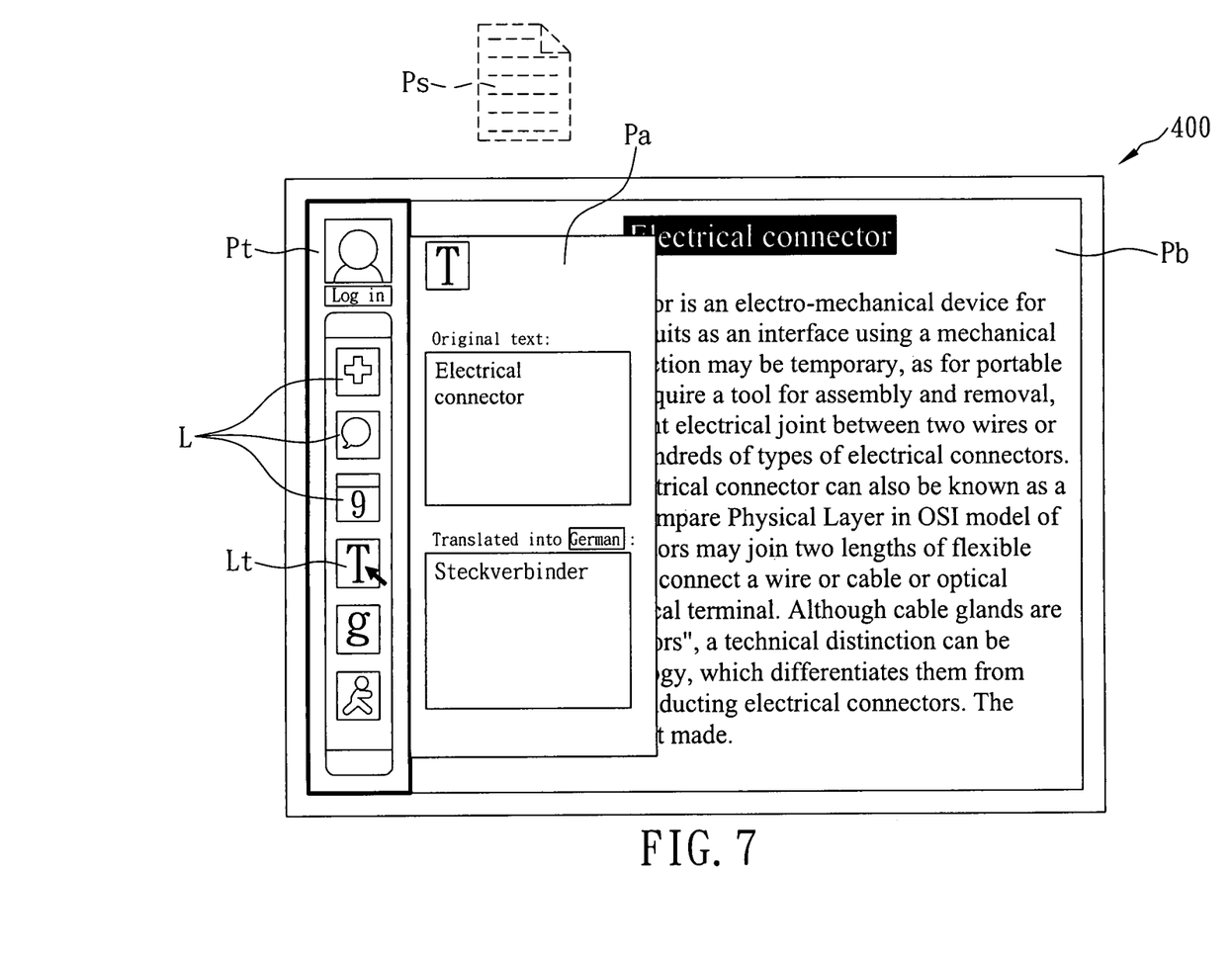
FIG. 7 schematically shows an application page according to the present invention, in addition to the web browser, the background page, and the toolbar page depicted in FIG. 5.

Referring to FIGS. 4 and 7, now that the user has clicked on the application linking object Lt, the terminal device 40 is connected to the application server 43 to obtain therefrom an application page Pa that corresponds to the application linking object Lt. After obtaining and loading the application page Pa, the terminal device 40 retrieves the page information on the background page Pb (i.e., the user-selected text "Electrical connector") from the status page Ps as requested by the application page Pa and transfers the page information to the application page Pa at once. The page information, once received by the application page Pa, is further transferred by the terminal device 40 to the application server 43 by way of the application page Pa so as for the terminal device 40 to obtain a computation result from the application server 43. In this preferred embodiment, the computation result is the desired German translation "Steckverbinder" and is displayed on the application page Pa. It should be pointed out that while only one terminal device 40 is used in the present preferred embodiment, the present invention is not limited thereto. The number of the terminal device 40 in the information transmission system 4 can be increased so that a plurality of such terminal devices are connected respectively to the web server 41, the toolbar server 42, and the application server 43 via the network 44. All combinations and variations that are easily conceivable by a person skilled in the art should fall within the scope of the present invention. Moreover, although in the foregoing preferred embodiment it is the page information on the background page Pb that the terminal device 40 stores into the status page Ps, the present invention is not limited thereto, neither. While designing the information transmission system 4 according to the present invention, the terminal device 40 can be configured in such a way that it stores page information on the toolbar page Pt into the status page Ps so as to realize the functions needed.

Figure 8:
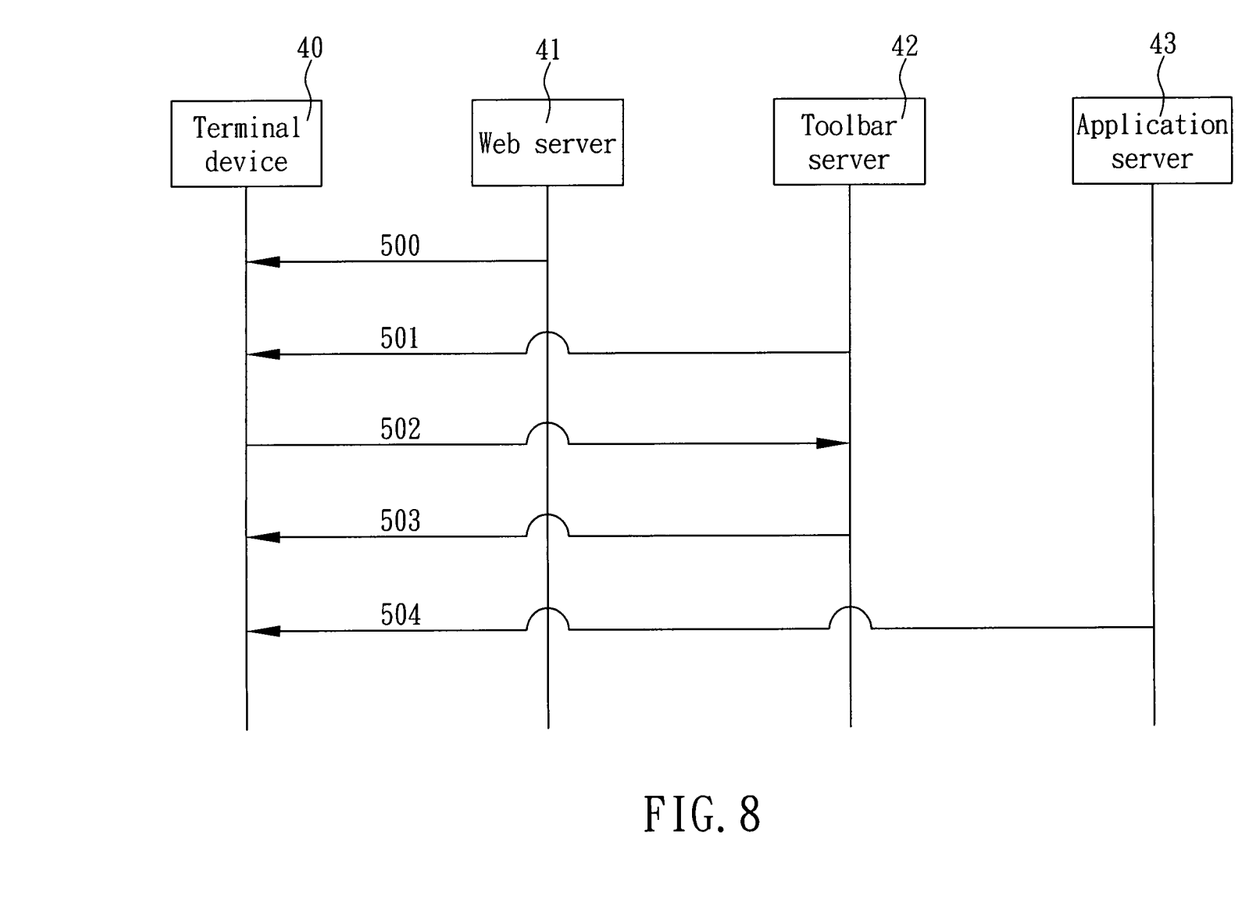
FIG. 8 is a sequence diagram for the preferred embodiment of the present invention.

The process flow of the present invention is further described with reference to the sequence diagram in FIG. 8 so that a person skilled in the art can implement the present invention accordingly.

(500) The terminal device 40 obtains a background page Pb from the web server 41 (see FIG. 5).

(501) The terminal device 40 obtains a toolbar page Pt from the toolbar server 42 such that the toolbar page Pt is embedded in the background page Pb (see FIG. 5).

(502) When the user clicks on the application linking object Lt via the terminal device 40, the terminal device 40 sends a signal to the toolbar server 42.

(503) According to the signal received, the toolbar server 42 sends a status page Ps to the terminal device 40 (see FIG. 7), so as for the terminal device 40 having received the status page Ps to store page information on the background page Pb or page information on the toolbar page Pt into the status page Ps.

(504) The terminal device 40 is connected to the application server 43 such that the application server 43' sends to the terminal device 40 an application page Pa corresponding to the application linking object Lt (see FIG. 7). Then, as requested by the application page Pa, the terminal device 40 retrieves the page information on the background page Pb or on the toolbar page Pt from the status page Ps and sends the page information to the application page Pa, so as for the application page Pa to process the page information.

In summary, with the status page Ps working in conjunction with the background page Pb or the toolbar page Pt, the terminal device 40 can transmit page information on the background page Pb or on the toolbar page Pt instantly to the application page Pa as requested by the application page Pa, thereby effectively solving the problem of the prior art that information cannot be transferred freely between electronic pages. In addition, with the terminal device 40 storing the page information on the background page Pb or on the toolbar page Pt into the status page Ps in advance, the terminal device 40 can readily provide the application page Pa with the page information regardless of whether the page information is needed after the terminal device 40 has loaded the application page Pa or, due to a large file size of the application page Pa or a low load speed of the terminal device 40, is needed while the application page Pa is being loaded. Therefore, delayed information transmission and pauses in page loading are effectively prevented, and information transmission efficiency significantly increased. In other words, page browsing via the terminal device 40 can be done with enhanced efficiency and smoothness. Last but not least, as the otherwise necessary copy-and-paste operations between the application page Pa and the background page Pb are dispensed with, the functions of the application page Pa can take effect without unnecessary delay, thus also facilitating page browsing.

It should be noted that the translation application program demonstrated in the foregoing preferred embodiment is intended only to expound the principle of the present invention; the concept of the present invention can be applied to other application programs as well. Besides, the technical features of the present invention are not limited by the preferred embodiment described above. Any variations or modifications which are based on the concept disclosed herein and are readily conceivable by a person skilled in the art should be encompassed by the appended claims.

What is claimed is:

1. A method for transmitting information between multiple electronic pages, wherein the method is applicable to an information transmission system, the information transmission system comprises a terminal device, a web server, a toolbar server and an application server, and the terminal device is connected respectively to the web server, the toolbar server and the application server by a network; the method comprising the steps, performed by the terminal device after a web browser installed in the terminal device is executed, of:

obtaining a background page from the web server and showing the background page on the terminal device;

obtaining a toolbar page from the toolbar server, and embedding and showing the toolbar page in the background page, wherein the toolbar page includes at least one application linking object;

sending a signal to the toolbar server when the application linking object is clicked on, so as for the toolbar server to send a status page to the terminal device according to the signal, wherein the status page is not shown on the terminal device;

storing page information being marked by a user on the background page into the status page after receiving the status page;

connecting to the application server and obtaining an application page from the application server, wherein the application page corresponds to the application linking object clicked on and is shown on the terminal device;

retrieving the page information from the status page as requested by the application page and sending the page information to the application page;

sending the page information to the application server through the application page, so as for the application server to send a computation result to the terminal device according to the page information after receiving the page information; and receiving the computation result and then displaying the computation result on the application page.

* * * * *